Jan. 14, 1964 P. A. VINCENT 3,118,137
BATTERY WARNING INDICATOR
Filed July 29, 1959

INVENTOR.
Peter A. Vincent
BY
ATTORNEY 3,118,137
BATTERY WARNING INDICATOR
Peter A. Vincent, Long Branch, N.J., assignor to The Bendix Corporation, a corporation of Delaware
Filed July 29, 1959, Ser. No. 830,297
4 Claims. (Cl. 340—249)

The present invention relates to a warning indicator and more particularly to a warning indicator for indicating the useful remaining life of a partially discharged storage battery.

In some applications, for example aircraft, it is desirable upon a failure of the power supply to have an indication at a predetermined time prior to the end of the useful life of the battery. Knowing the remaining useful life of the battery will enable the pilot to determine the emergency measures necessary while still having some remaining life in the battery. Without such a device, the first indication will be upon a complete failure of the battery.

The useful remaining life of a partially discharged storage battery can be determined by a knowledge of the voltage drop characteristic of the battery being discharged at a relatively constant current. The terminal voltage falls substantially constant due to sulphation effects, however, near the end of the battery life, the available material remaining to undergo the reversible reaction of charge and discharge decreases progressively faster. Therefore, a device which would indicate when a given terminal voltage is reached can be calibrated to show an indicated remaining life. The present invention provides means for presetting the potential at which time an indicator would be activated to indicate the battery's calibrated remaining life for a constant rate of discharge.

It is an object of the invention to provide a novel warning indicator.

Another object of the invention is to provide an indicator to indicate a predetermined time prior to the end of the useful life of a battery.

Another object of the invention is to provide a method for determining a battery's remaining useful life.

Another object of the invention is to provide a novel device to indicate when the terminal voltage of a battery falls below a predetermined value.

The above and other objects and features of the invention will appear more fully hereinafter from a consideration of the following description taken in connection with the accompanying drawing wherein one embodiment of the invention is illustrated by way of example.

Figure 1:
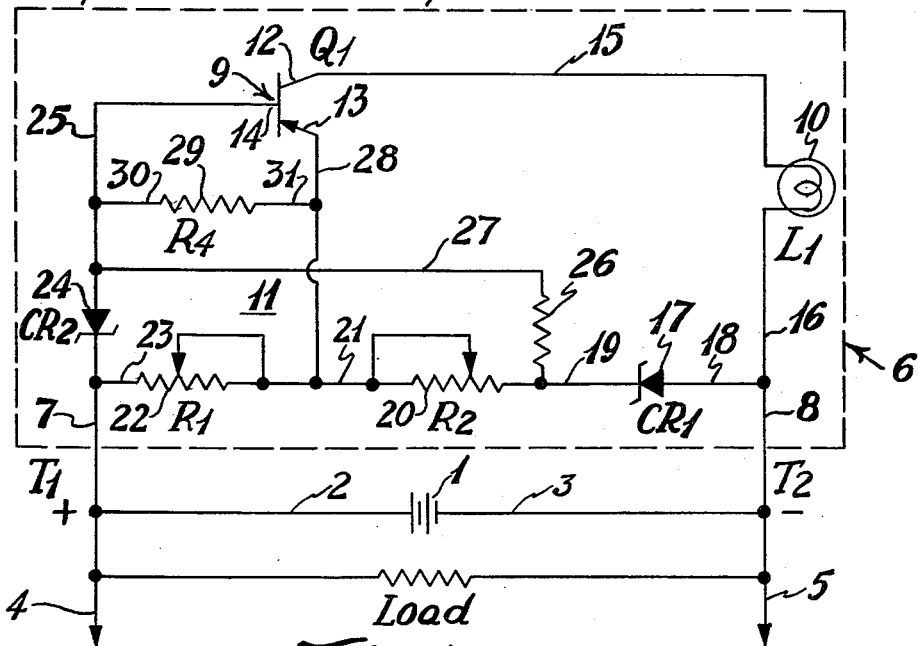
FIGURE 1 is a schematic diagram of a device embodying the invention.

Referring now to the drawing, a battery is indicated generally by the numeral 1 and may be connected by conductors 2 and 3 across buses 4 and 5, which are normally energized from a suitable power source (not shown) such as in a typical aircraft electrical system. Normally, the electrical load is supplied from the power source with the battery as a source of standby or emergency power.

A warning indicator 6 is connected by conductors 7 and 8 across the battery 1. The indicator 6 includes a transistor 9, indicator lamp 10 and sensing circuit 11. The transistor 9 is illustrated as being a PNP type and has a collector 12, emitter 13 and base 14. The collector 12 is connected by conductor 15 to one terminal of the indicator lamp 10. The other terminal of the lamp 10 is connected by conductor 16 to the conductor 8.

The sensing circuit 11 includes a zener diode 17 having one side connected by a conductor 18 to the conductor 16. The other side of the diode 17 is connected by conductor 19 to a resistor 20. The other side of the resistor 20 is connected by conductor 21 to a resistor 22, the other side of which is connected by conductor 23 to one side of a zener diode 24. The conductor 23 is also connected to the conductor 7. The other side of the diode 24 is connected by conductor 25 to the base 14 of the transistor 9. Also connected to the conductor 19 is one end of a resistor 26. The other end of the resistor 26 is connected by conductor 27 to the conductor 25. The emitter 13 of the transistor 9 is connected by conductor 28 to the conductor 21. A resistor 29 is connected across the conductors 25 and 28 by conductors 30 and 31.

In operation the battery voltage is impressed across the conductors 7 and 8. As the terminal voltage of the battery decreases due to the discharging conditions of the battery, this voltage change is impressed across the resistors 22 and 20. The voltage dropped across the zener diode 17 is the conducting voltage of the diode, which is smaller than the normal battery voltage, therefore, the diode 17 will not sense the incremental change.

On the other hand, the zener diode 24 will sense an incremental terminal voltage change. One current path is formed by the diode 24 and the resistor 29. A second current path through resistor 29, in the opposite direction, is formed by the resistor 29 and the resistor 26. The voltage across the resistor 22 is impressed across the diode 24 and the resistor 29, while the voltage across the resistor 20 is impressed across the resistors 26 and 29. The ratio of the resistor 22 to resistor 20 is such that a substantial portion of the voltage will be dropped across the resistor 22, hence the incremental voltage change will be substantially across the resistor 22.

The two current paths set up bucking currents flowing through the resistor 29 and provide a differential voltage across the resistor 29. The voltage provides a bias for the transistor 9. When the battery is normally charged and the voltage normal, the voltage across the resistor 22 will be high and the differential voltage across the resistor 29 will provide a negative bias, on the emitter, which will prevent the transistor 9 from conducting. As the battery discharges and its terminal voltage decreases, the voltage change will be reflected across the resistor 22. When the voltage across the resistor 22 is less than the conducting voltage of the zener diode 24, the zener diode substantially stops conducting, the differential voltage across the resistor 29 will reverse in polarity and will provide a positive bias for the emitter of the transistor 9. The transistor 9 will then conduct and the voltage across the diode 17 less the voltage dropped across the resistor 20 and the emitter to collector junction of the transistor will be impressed across the indicating lamp 10 causing it to light up.

If a charging source is now connected to the battery, the voltage across the resistor 22 will increase and the bias voltage will reverse to switch off the transistor and the lamp will go out.

Figure 2:
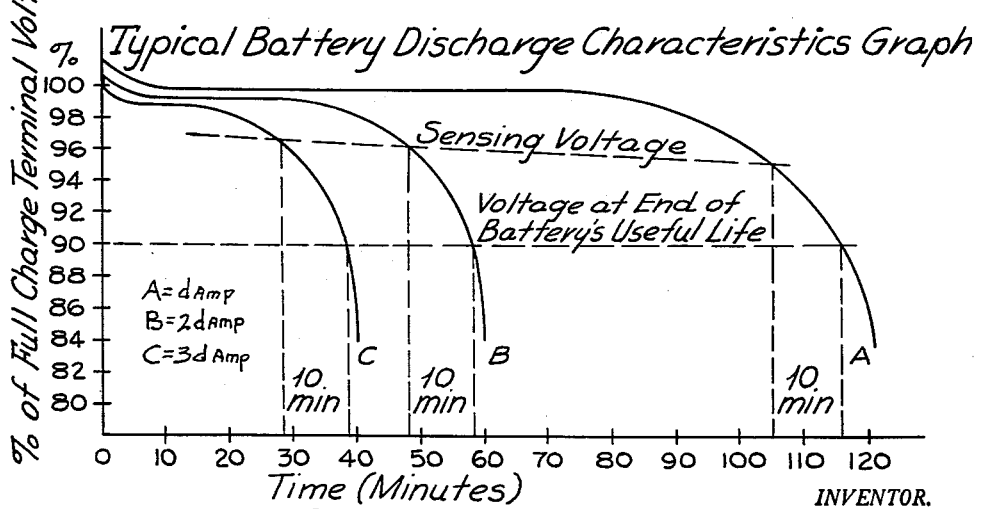
FIGURE 2 is a graph illustrating typical battery discharge characteristics.

The terminal voltage of a battery is a function of the charge remaining in it. As the charge decreases due to the length of time of current flow, assuming a constant discharge current, the terminal voltage will decline according to the battery's discharge characteristics as illustrated in FIGURE 2.

In order to activate the indicator at a desired time prior to the end of useful battery life, the indicator is set to sense a terminal voltage selected from a graph of the battery's discharge characteristics. For a given discharge current, a curve is selected from the graph corresponding thereto, then a time of useful remaining life is assigned and marked off on the graph. The intercept of the voltage curve for constant current and time of useful remaining life determines the sensing voltage for that particular discharge current. This process of calibration may be followed for any desired warning time and rate of current use. It is only necessary to know the discharge characteristics of a given battery which may be obtained from the battery manufacturer or from testing the battery itself.

Although only one example of the invention has been described, various changes in the form and relative arrangement of the parts, which will now appear to those skilled in the art, may be made without departing from the scope of the invention.

What is claimed is:

1. A battery warning indicator comprising; a battery, a voltage divider network connected across terminals of said battery, a voltage breakdown device connected at one end to one terminal of said battery, a voltage sensing resistor connected to the other end of said breakdown device and to an intermediate point of said voltage divider, a further resistance in shunt across said other end of said breakdown device and the other terminal of said battery, a transistor having its base and emitter biased Off by said voltage sensing resistor at a battery voltage rendering said breakdown device conductive and biased On at a lower battery voltage which renders the breakdown device non-conductive, indicator means in circuit with the collector of said transistor and said battery to indicate reduced battery voltage.

2. A battery warning indicator comprising; a battery, a voltage divider network connected across terminals of said battery, a voltage breakdown device connected to one end to one terminal of said battery, a voltage sensing resistor connected to the other end of said breakdown device and to an intermediate point of said voltage divider, a further resistance in shunt across said other end of said breakdown device and the other terminal of said battery, a transistor having its base and emitter biased Off by said voltage sensing resistor at a battery voltage rendering said breakdown device conductive and biased On at a lower battery voltage which renders the breakdown device non-conductive, indicator means in circuit with the said intermediate point of said voltage divider, the emitter and collector and said other terminal of the battery to indicate a particular battery condition.

3. A battery warning indicator comprising; a battery, a voltage divider network connected across terminals of said battery, a zener diode connected at one end to one terminal of said battery, a voltage sensing resistor connected to the other end of said zener diode and to an intermediate point of said voltage divider, a further resistance in shunt across said other end of said zener diode and the other terminal of said battery, a transistor having its base and emitter biased Off by said voltage sensing resistor at a battery voltage rendering said zener diode conductive and biased On at a lower battery voltage which renders the zener diode non-conductive, indicator means in circuit with the collector of said transistor and said battery to indicate reduced battery voltage.

4. A battery warning indicator comprising; a battery, a voltage divider network connected across terminals of said battery, a zener diode connected at one end to one terminal of said battery, a voltage sensing resistor connected to the other end of said zener diode and to an intermediate point of said voltage divider, a further resistance in shunt across said other end of said zener diode and the other terminal of said battery, a transistor having its base and emitter biased Off by said voltage sensing resistor at a battery voltage rendering said zener diode conductive and biased On at a lower battery voltage which renders the zener diode non-conductive, indicator means in circuit with the said intermediate point of said voltage divider, the emitter and collector and said other terminal of the battery to indicate a particular battery condition.

References Cited in the file of this patent

UNITED STATES PATENTS

| 1,535,622 | Morgan | Apr. 28, 1925 |
| 2,772,410 | Logue et al. | Nov. 27, 1956 |
| 2,776,420 | Woll | Jan. 1, 1957 |
| 2,864,053 | Woodworth | Dec. 9, 1958 |
| 2,876,387 | Doelman | Mar. 3, 1959 |
| 2,956,268 | Kline | Oct. 11, 1960 |